US012441102B2

(12) United States Patent
Kawano et al.

(10) Patent No.: US 12,441,102 B2
(45) Date of Patent: Oct. 14, 2025

(54) LIQUID EJECTION APPARATUS AND ABNORMALITY DETECTION METHOD CAPABLE OF DETECTING ABNORMALITY OF NOZZLE

(71) Applicant: KYOCERA Document Solutions Inc., Osaka (JP)

(72) Inventors: Daichi Kawano, Osaka (JP); Takashi Inoue, Osaka (JP); Keisuke Maeyama, Osaka (JP); Tatsuya Nakagawa, Osaka (JP); Satoshi Morimoto, Osaka (JP); Minori Yamamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 275 days.

(21) Appl. No.: 18/476,136

(22) Filed: Sep. 27, 2023

(65) Prior Publication Data

US 2024/0109288 A1 Apr. 4, 2024

(30) Foreign Application Priority Data

Sep. 29, 2022 (JP) ................................. 2022-156454

(51) Int. Cl.
*B41J 2/155* (2006.01)
*B41J 2/045* (2006.01)

(52) U.S. Cl.
CPC ......... *B41J 2/0451* (2013.01); *B41J 2/04581* (2013.01)

(58) Field of Classification Search
CPC ............... B41J 2/04596; B41J 2/04598; B41J 2/04501; B41J 2/0451; B41J 2/16579; B41J 2/2142
See application file for complete search history.

(56) References Cited

U.S. PATENT DOCUMENTS

2006/0274105 A1* 12/2006 Nishihara ................ B41J 2/125 347/19
2011/0050775 A1* 3/2011 Komatsu .................. B41J 2/125 347/14
2022/0072856 A1* 3/2022 Yajima ................. B41J 2/14233

FOREIGN PATENT DOCUMENTS

JP 2004299341 A 10/2004

* cited by examiner

*Primary Examiner* — Scott A Richmond
(74) *Attorney, Agent, or Firm* — Alleman Hall & Tuttle LLP

(57) ABSTRACT

A liquid ejection apparatus includes a nozzle, a pressure chamber, a piezoelectric element, an acquisition processing portion, and a restriction processing portion. The nozzle ejects a liquid. The pressure chamber communicates with the nozzle and contains the liquid. The piezoelectric element changes a pressure in the pressure chamber in response to an input of a drive signal. When image formation processing for ejecting the liquid from the nozzle is executed based on image data, the acquisition processing portion acquires a length of a non-ejection period in which the liquid is not ejected from the nozzle, the non-ejection period being included in an execution period of the image formation processing. When the length of the non-ejection period acquired by the acquisition processing portion is less than a predetermined first threshold value, the restriction processing portion restricts abnormality detection processing for detecting an abnormality of the nozzle using the piezoelectric element.

5 Claims, 8 Drawing Sheets

FIG.9

| EJECTION INTERVAL (sec) | NUMBER OF OSCILLATIONS | | | |
|---|---|---|---|---|
| | Black | Cyan | Magenta | Yellow |
| 0.05 | 3 | 3 | 3 | 3 |
| 0.10 | 8 | 8 | 8 | 8 |
| 0.20 | 17 | 17 | 17 | 17 |
| 0.40 | 100 | 25 | 25 | 25 |
| 0.80 | 300 | 80 | 80 | 80 |
| ⋮ | ⋮ | ⋮ | ⋮ | ⋮ |
| 3600.00 | 1900 | 1900 | 1900 | 1300 |

LIQUID EJECTION APPARATUS AND ABNORMALITY DETECTION METHOD CAPABLE OF DETECTING ABNORMALITY OF NOZZLE

INCORPORATION BY REFERENCE

This application is based upon and claims the benefit of priority from the corresponding Japanese Patent Application No. 2022-156454 filed on Sep. 29, 2022, the entire contents of which are incorporated herein by reference.

BACKGROUND

The present disclosure relates to a liquid ejection apparatus and an abnormality detection method.

A liquid ejection apparatus such as an ink jet printer that ejects a liquid such as ink is known. For example, the liquid ejection apparatus includes a nozzle, a pressure chamber, and a piezoelectric element. The nozzle ejects the liquid. The pressure chamber communicates with the nozzle and contains the liquid. The piezoelectric element changes a pressure in the pressure chamber in response to an input of a drive signal.

In addition, the liquid ejection apparatus is known as related art which, when image formation processing for ejecting the liquid from the nozzle is executed based on image data, executes abnormality detection processing for detecting an abnormality of the nozzle using the piezoelectric element during a non-ejection period in which the liquid is not ejected from the nozzle which is included in an execution period of the image formation processing.

SUMMARY

A liquid ejection apparatus according to one aspect of the present disclosure includes a nozzle, a pressure chamber, a piezoelectric element, an acquisition processing portion, and a restriction processing portion. The nozzle ejects a liquid. The pressure chamber communicates with the nozzle and contains the liquid. The piezoelectric element changes a pressure in the pressure chamber in response to an input of a drive signal. When image formation processing for ejecting the liquid from the nozzle is executed based on image data, the acquisition processing portion acquires a length of a non-ejection period in which the liquid is not ejected from the nozzle, the non-ejection period being included in an execution period of the image formation processing. When the length of the non-ejection period acquired by the acquisition processing portion is less than a predetermined first threshold value, the restriction processing portion restricts execution of abnormality detection processing for detecting an abnormality of the nozzle using the piezoelectric element.

An abnormality detection method according to another aspect of the present disclosure is executed by a liquid ejection apparatus comprising: a nozzle configured to eject a liquid, a pressure chamber communicating with the nozzle and configured to contain the liquid; and a piezoelectric element configured to change a pressure in the pressure chamber in response to an input of a drive signal, and includes an acquisition step and a restriction step. In the acquisition step, when image formation processing for ejecting the liquid from the nozzle is executed based on image data, a length of a non-ejection period in which the liquid is not ejected from the nozzle is acquired, the non-ejection period being included in an execution period of the image formation processing. In the restriction step, when the length of the non-ejection period acquired by the acquisition step is less than a predetermined first threshold value, execution of abnormality detection processing for detecting an abnormality of the nozzle using the piezoelectric element is restricted.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 9 is a diagram showing an example of table data used in the image forming apparatus according to the embodiment of the present disclosure.

DETAILED DESCRIPTION

An embodiment of the present disclosure will be described below with reference to the drawings. It is noted that the following embodiment is an example of embodying the present disclosure and does not limit the technical scope of the present disclosure.

[Configuration of Image Forming Apparatus 100]

Figure 1:
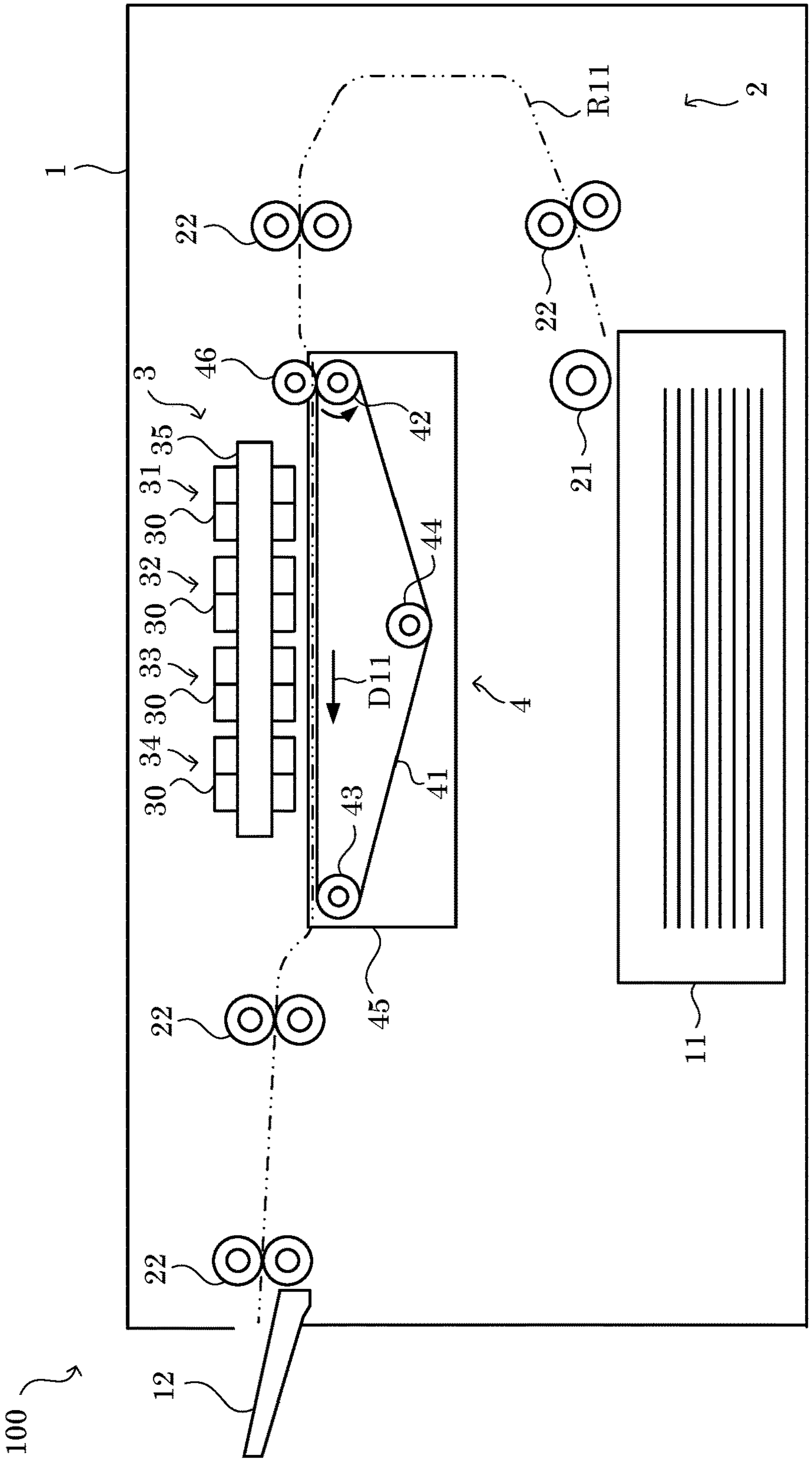
FIG. 1 is a diagram showing a configuration of an image forming apparatus according to an embodiment of the present disclosure.
Figure 2:
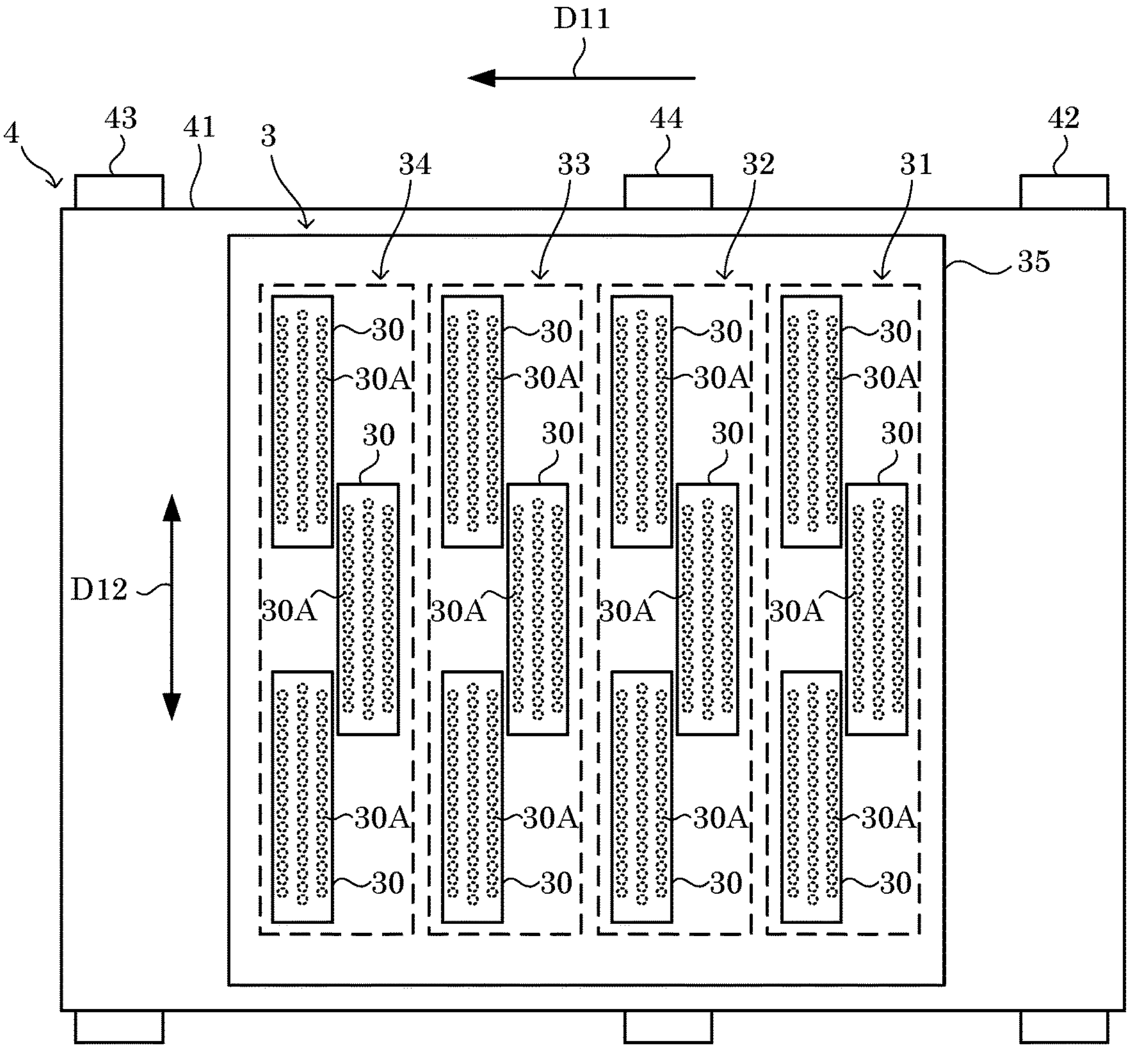
FIG. 2 is a diagram showing a configuration of an image forming portion and a conveying unit of the image forming apparatus according to the embodiment of the present disclosure.
Figure 3:
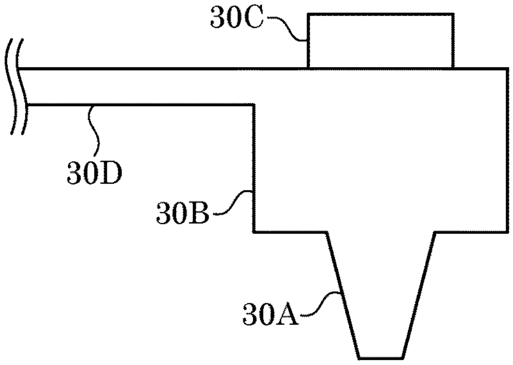
FIG. 3 is a diagram showing a configuration around nozzles of the image forming apparatus according to the embodiment of the present disclosure.

First, a configuration of an image forming apparatus 100 according to an embodiment of the present disclosure will be described with reference to FIG. 1 to FIG. 4. Here, FIG. 1 is a cross-sectional view showing a configuration of the image forming apparatus 100. In addition, FIG. 2 is a plan view showing configurations of an image forming portion 3 and a conveying unit 4. In addition, FIG. 3 is a cross-sectional view showing a configuration of a nozzle 30A, a pressure chamber 30B, a piezoelectric element 30C, and an individual flow path 30D. It is noted that a sheet conveying path R11 is indicated by a dash-dot-dot-dash line in FIG. 1.

The image forming apparatus 100 is a printer that can form an image on a sheet by an inkjet method. The image forming apparatus 100 is an example of the liquid ejection apparatus of the present disclosure. It is noted that the present disclosure may be applied to image forming apparatuses, such as a facsimile machine, a copier, and a multi-function peripheral, that can form an image on a sheet by an inkjet method.

As shown in FIG. 1 to FIG. 4, the image forming apparatus 100 includes a housing 1, a sheet conveying portion 2, an image forming portion 3, a conveying unit 4, an operation display portion 5, a storage portion 6, a first control portion 7, and a second control portion 8.

The housing 1 houses the constituent elements of the image forming apparatus 100. In the housing 1, a sheet feed cassette 11 (see FIG. 1) is detachably provided. The sheet feed cassette 11 contains sheets on which images are formed. A sheet discharge tray 12 (see FIG. 1) is provided on an outer surface of the housing 1. Sheets on which images have been formed by the image forming portion 3 are discharged to the sheet discharge tray 12. Inside the housing 1, the sheets contained in the sheet feed cassette 11 are conveyed along a sheet conveying path R11 (see FIG. 1) that leads to the sheet discharge tray 12 via an image forming position of the image forming portion 3.

The sheet conveying portion 2 conveys the sheets contained in the sheet feed cassette 11 along the sheet conveying path R11 (see FIG. 1). As shown in FIG. 1, the sheet conveying portion 2 includes a pickup roller 21 and a plurality of conveying rollers 22. The pickup roller 21 takes out the uppermost sheet in the sheet stack contained in the sheet feed cassette 11 and feeds the sheet to the sheet conveying path R11. The plurality of conveying rollers 22 are provided along the sheet conveying path R11. The conveying rollers 22 each convey the sheet along the sheet conveying path R11. The conveying rollers 22 each convey the sheet in a conveying direction D11 (see FIG. 1) from the sheet feed cassette 11 to the sheet discharge tray 12.

The image forming portion 3 forms, on the sheet, an image based on image data for image formation. As shown in FIG. 1, the image forming portion 3 includes line heads 31 to 34 and a head frame 35.

As shown in FIG. 2, each of the line heads 31 to 34 is long in a width direction D12 orthogonal to the conveying direction D11. Specifically, the line heads 31 to 34 each have a length in the width direction D12 corresponding to the width of the maximum size sheet among the sheets that can be contained in the sheet feed cassette 11. The line heads 31 to 34 are provided at regular intervals along the conveying direction D11.

As shown in FIG. 2, the line heads 31 to 34 each include a plurality of print heads 30. The print heads 30 each eject ink toward the sheet conveyed by the conveying unit 4. The print heads 30 provided in the line head 31 each eject black ink. The print heads 30 provided in the line head 32 each eject cyan ink. The print heads 30 provided in the line head 33 each eject magenta ink. The print heads 30 provided in the line head 34 each eject yellow ink.

The print heads 30 each include a plurality of nozzles 30A (see FIG. 2 and FIG. 3) that eject ink (an example of the liquid of the present disclosure). The nozzles 30A are provided on a surface of the corresponding print head 30 that faces the sheet conveyed by the conveying unit 4.

In addition, the print heads 30 each include a pressure chamber 30B (see FIG. 3), a piezoelectric element 30C (see FIG. 3), and an individual flow path 30D (see FIG. 3) corresponding to each of the nozzles 30A. The pressure chamber 30B communicates with the nozzle 30A and contains ink. The piezoelectric element 30C changes the pressure in the pressure chamber 30B in response to an input of a drive signal. The drive signal is an electric signal whose voltage changes over time. Specifically, the piezoelectric element 30C changes the pressure in the pressure chamber 30B by vibrating the wall surface of the pressure chamber 30B in response to an input of the drive signal. For example, the piezoelectric element 30C causes the nozzle 30A to eject ink in response to an input of a predetermined drive signal for ejection. The individual flow path 30D is an ink flow path provided between the pressure chamber 30B and a common flow path (not shown) common to the plurality of nozzles 30A. A plurality of individual flow paths 30D corresponding to the plurality of nozzles 30A are connected to the common flow path. The common flow path is connected to an ink supply portion (not shown) that supplies ink to each pressure chamber 30B.

In addition, the print heads 30 each include a drive circuit 30E (see FIG. 4) corresponding to each piezoelectric element 30C. The drive circuit 30E drives the piezoelectric element 30C based on data input from the second control portion 8. Specifically, the drive circuit 30E generates the drive signal based on data input from the second control portion 8, and inputs the generated drive signal to the piezoelectric element 30C.

In addition, the print heads 30 each include a residual vibration detection circuit 37 (see FIG. 4) corresponding to the piezoelectric element 30C.

In the present embodiment, the line head 31 has three print heads 30 arranged in a staggered manner along the width direction D12. Similarly to the line head 31, each of the other line heads 32 to 34 also has three print heads 30 arranged in a staggered manner along the width direction D12. It is noted that FIG. 2 shows the image forming portion 3 as viewed from the top of FIG. 1.

The head frame 35 supports the line heads 31 to 34. The head frame 35 is supported by the housing 1. It is noted that the number of line heads included in the image forming portion 3 may be any number including one. In addition, the number of print heads 30 provided in each of the line heads 31 to 34 may be any number.

As shown in FIG. 1, the conveying unit 4 is disposed below the line heads 31 to 34. The conveying unit 4 conveys the sheet while having the sheet face the print heads 30. For example, each time the print heads 30 eject ink, the conveying unit 4 conveys the sheet by a predetermined conveying amount. In addition, the conveying unit 4 stops conveying the sheet while the print heads 30 are ejecting ink. As shown in FIG. 1, the conveying unit 4 includes a conveying belt 41 on which the sheet is placed, a first tension roller 42, a second tension roller 43, and a third tension roller 44 which tension the conveying belt 41, and a conveying frame 45 that supports them. It is noted that the gap between the conveying belt 41 and the print heads 30 is adjusted so that the gap between the surface of the sheet and the print heads 30 during image formation is a predetermined distance (for example, 1 mm).

The first tension roller 42 is driven to rotate by rotational drive force supplied by a motor (not shown). Thus, the conveying belt 41 rotates in a direction in which the sheet can be conveyed in the conveying direction D11 (see FIG. 1). It is noted that the conveying unit 4 is also provided with a suction unit (not shown) that sucks air from a large number of through holes formed in the conveying belt 41 in order to attract the sheet to the conveying belt 41. In addition, a pressure roller 46 is provided above the first tension roller 42 to convey the sheet while pressing the sheet against the conveying belt 41.

The operation display portion 5 includes a display portion such as a liquid crystal display that displays various types of information in response to a control instruction from the first control portion 7, and an operation portion such as operation keys or a touch panel that inputs various types of information to the first control portion 7 in response to a user's operation. The operation display portion 5 is provided on the upper surface of the housing 1.

The storage portion 6 is a nonvolatile storage device. For example, the storage portion 6 is a nonvolatile memory such as a flash memory.

Figure 4:
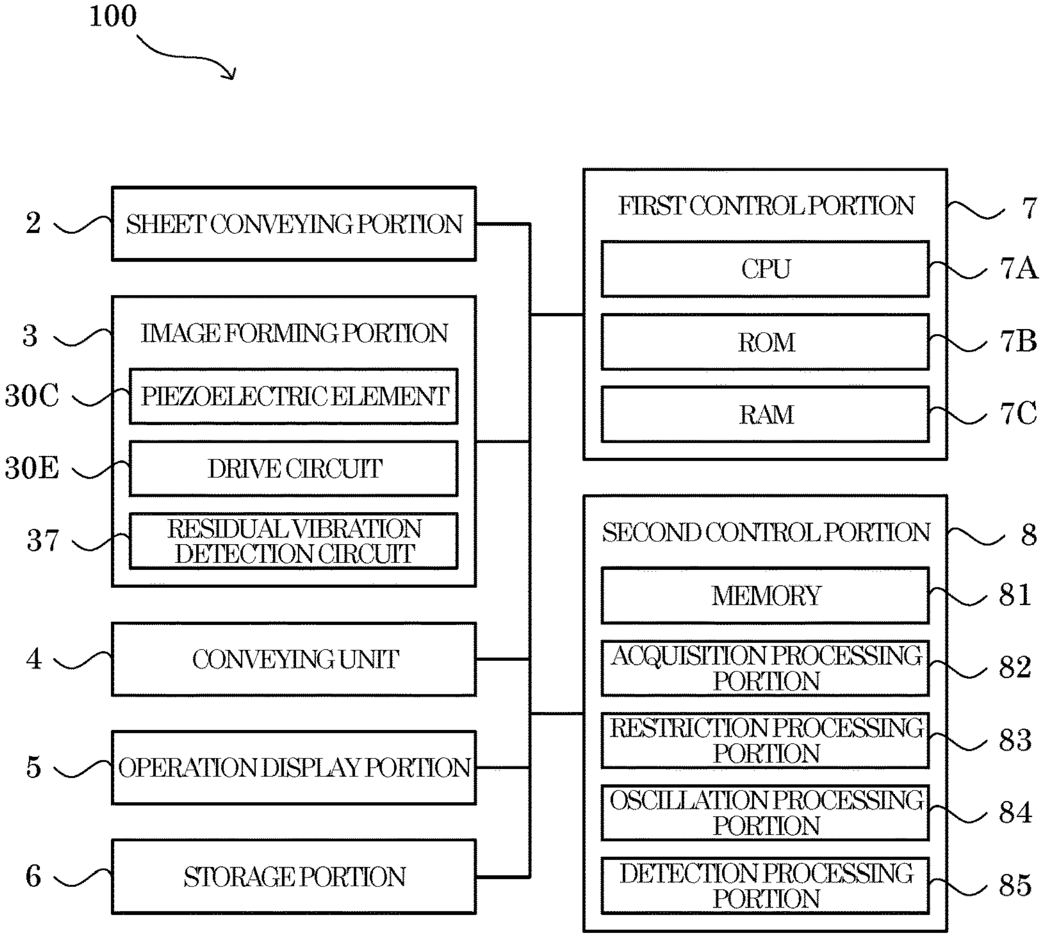
FIG. 4 is a block diagram showing a system configuration of the image forming apparatus according to the embodiment of the present disclosure.

The first control portion 7 performs overall control of the image forming apparatus 100. As shown in FIG. 4, the first control portion 7 includes a CPU 7A, a ROM 7B, and a RAM 7C. The CPU 7A is a processor that executes various types of arithmetic processing. The ROM 7B is a nonvolatile storage device in which information such as control programs for causing the CPU 7A to execute various types of processing are stored in advance. The RAM 7C is a volatile or nonvolatile storage device used as a temporary storage memory (work area) for various types of processing executed by the CPU 7A. The CPU 7A performs overall control of the image forming apparatus 100 by executing various control programs stored in the ROM 7B in advance.

The first control portion 7 inputs the image data to the second control portion 8 when image formation processing for forming an image by ejecting ink from the nozzle 30A based on the image data is executed.

The second control portion 8 controls the image forming portion 3 based on the image data input from the first control portion 7. For example, the second control portion 8 is constituted by an electronic circuit such as an integrated circuit (ASIC, DSP).

Specifically, the second control portion 8 executes conversion processing for converting each item of pixel data included in the image data into one of ejection pixel data used for ejection of ink from the nozzle 30A corresponding to the item of pixel data and non-ejection pixel data used for non-ejection of ink from the nozzle 30A corresponding to the item of pixel data.

Here, the ejection pixel data is data used to generate the drive signal for ejection. In addition, the non-ejection pixel data is data corresponding to a non-input state of the drive signal to the piezoelectric element 30C.

The second control portion 8 inputs the ejection pixel data or non-ejection pixel data obtained by the conversion processing to the corresponding drive circuit 30E. In the drive circuit 30E, the drive signal for ejection is generated in response to the input of the ejection pixel data. When the non-ejection pixel data is input, the drive signal is not generated in the drive circuit 30E.

As related art, there is known a liquid ejection apparatus that, when the image formation processing is executed, executes abnormality detection processing for detecting an abnormality of the nozzle 30A using the piezoelectric element 30C during a non-ejection period in which ink is not ejected from the nozzle 30A which is included in an execution period of the image formation processing.

However, in the liquid ejection apparatus according to the related art described above, the abnormality detection processing is executed regardless of the length of the non-ejection period. Therefore, when the non-ejection period is shorter than the time required to execute the abnormality detection processing, the execution of the abnormality detection processing may hinder the execution of the image formation processing.

In contrast, the image forming apparatus 100 according to the embodiment of the present disclosure can detect an abnormality of the nozzle 30A without hindering the execution of the image formation processing, as will be described below.

[Configuration of Residual Vibration Detection Circuit 37]

Figure 5:
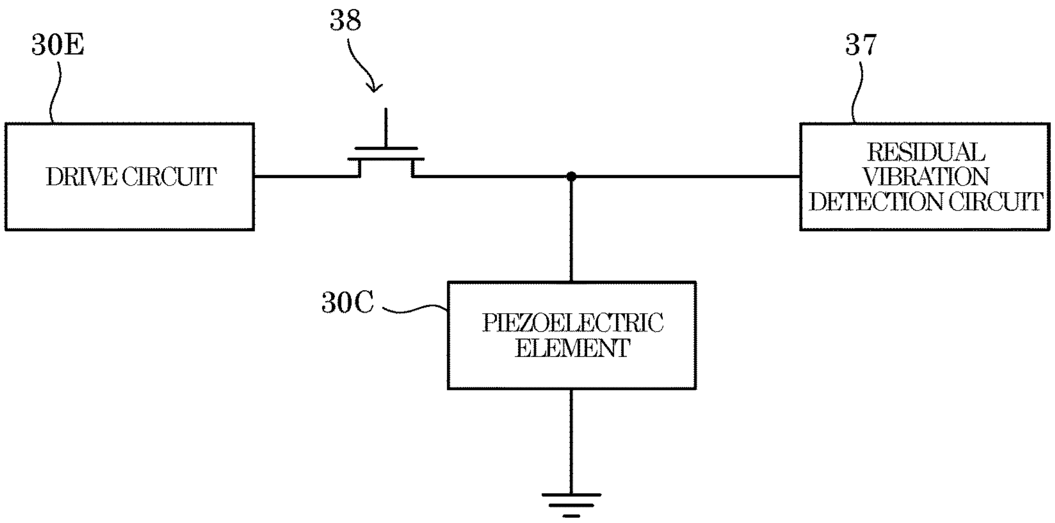
FIG. 5 is a diagram showing a connection state of a residual vibration detection circuit of the image forming apparatus according to the embodiment of the present disclosure.
Figure 6:
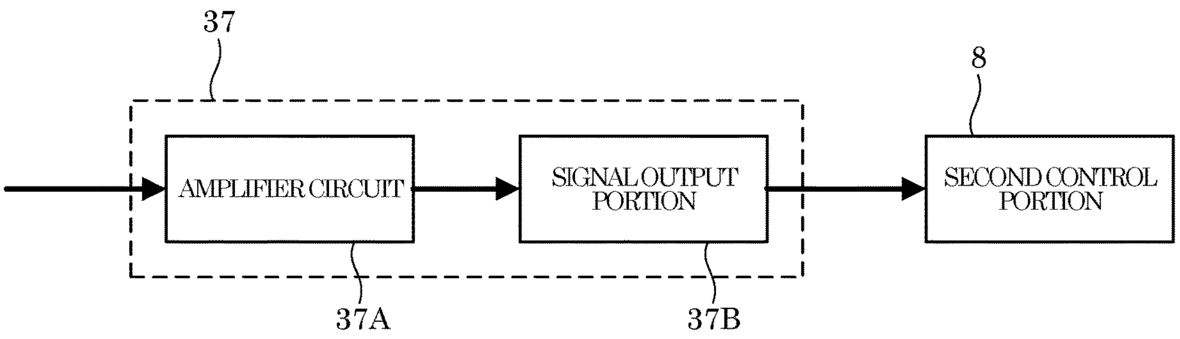
FIG. 6 is a diagram showing a configuration of the residual vibration detection circuit of the image forming apparatus according to the embodiment of the present disclosure.
Figure 7:
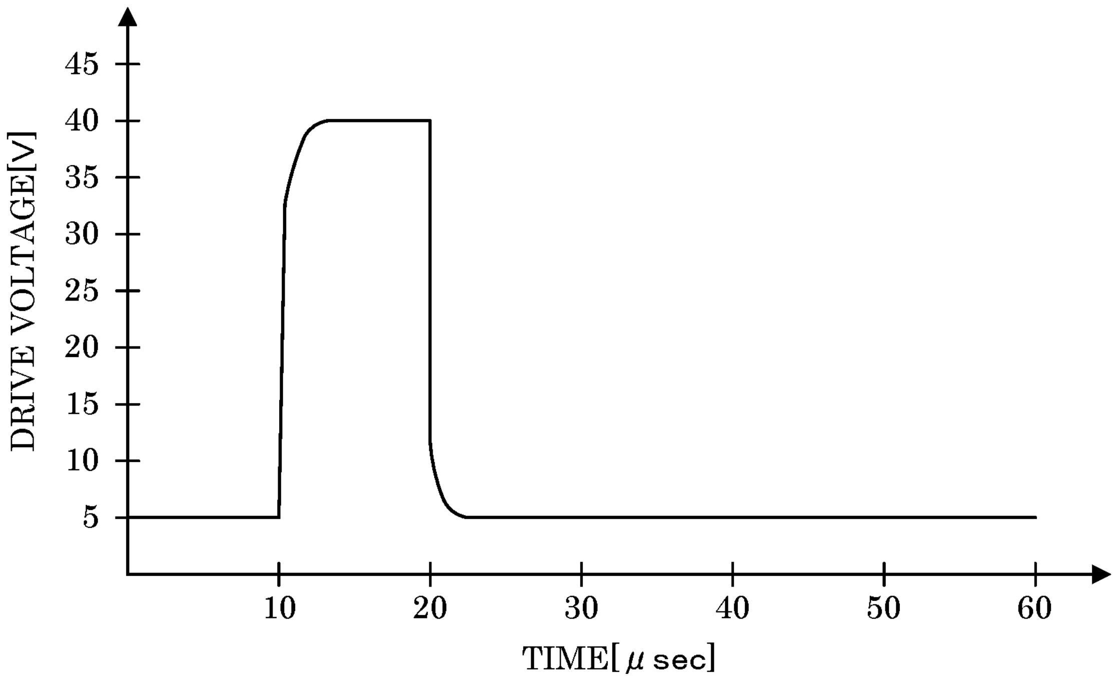
FIG. 7 is a diagram showing an example of a drive signal for detection input to a piezoelectric element of the image forming apparatus according to the embodiment of the present disclosure.

Next, a configuration of the residual vibration detection circuit 37 will be described with reference to FIG. 5 to FIG. 7. Here, FIG. 5 is a block diagram showing a connection state of the residual vibration detection circuit 37. In addition, FIG. 6 is a block diagram showing a configuration of the residual vibration detection circuit 37. It is noted that, in FIG. 6, the flow of the electric signal from the piezoelectric element 30C to the second control portion 8 is indicated by thick lines with arrows.

The residual vibration detection circuit 37 detects residual vibration generated in the pressure chamber 30B in response to an input of a predetermined drive signal for detection (see FIG. 7) to the piezoelectric element 30C.

Here, the drive signal for detection is a signal capable of generating vibration in the pressure chamber 30B and incapable of causing the nozzle 30A to eject ink. The drive signal for detection is desirably determined so that the vibration generated in the pressure chamber 30B is as large as possible. For example, as shown in FIG. 7, the drive signal for detection is a signal having a single push-pull drive pulse waveform. The drive circuit 30E generates the drive signal for detection in response to an input of predetermined detection pixel data from the second control portion 8, and outputs the generated drive signal for detection. It is noted that the drive signal for detection may be a signal having a pull-push drive pulse waveform.

Specifically, the residual vibration detection circuit 37 outputs a pulse signal every time an input signal corresponding to the residual vibration output from the piezoelectric element 30C exceeds a predetermined threshold value.

As shown in FIG. 5, the residual vibration detection circuit 37 is electrically connected between the drive circuit 30E and the piezoelectric element 30C on an energizing path from the drive circuit 30E to the ground via the piezoelectric element 30C. A switch 38, such as an analog switch, is provided between the drive circuit 30E and a connection portion of the energizing path to the residual vibration detection circuit 37. The switch 38 is turned on when the drive signal is input from the drive circuit 30E to the piezoelectric element 30C. In addition, the switch 38 is switched from the ON state to the OFF state after the input of the drive signal for detection from the drive circuit 30E to the piezoelectric element 30C. As a result, the input signal output from the piezoelectric element 30C in response to the input of the drive signal for detection is input to the residual vibration detection circuit 37.

As shown in FIG. 6, the residual vibration detection circuit 37 includes an amplifier circuit 37A and a signal output portion 37B.

The amplifier circuit 37A amplifies the input signal corresponding to the residual vibration output from the piezoelectric element 30C at a predetermined amplification ratio.

The signal output portion 37B outputs a pulse signal when the amplified input signal input from the amplifier circuit 37A exceeds the threshold value. For example, the signal output portion 37B is a comparator including a first input terminal connected to an output terminal of the amplifier circuit 37A, a second input terminal to which a voltage corresponding to the threshold value is input, and an output terminal. It is noted that the threshold value may be determined based on the amplitude of the input signal when the viscosity of the ink contained in the pressure chamber 30B is within a normal range.

It is noted that the input signal corresponding to the residual vibration includes a first vibration component corresponding to the vibration of the piezoelectric element 30C and a second vibration component corresponding to the vibration of the ink in the pressure chamber 30B. The first vibration component has a frequency in the gigahertz band. The second vibration component has a frequency in the kilohertz band. The viscosity of the ink in the pressure chamber 30B is reflected in the second vibration component. Therefore, the residual vibration detection circuit 37 may include a band-pass filter that removes the first vibration component from the input signal input to the amplifier circuit 37A.

The pulse signal output from the signal output portion 37B is input to the second control portion 8.

It is noted that the residual vibration detection circuit 37 may include an AC coupling capacitor that removes a DC component from the input signal input to the amplifier circuit 37A. This makes it possible to remove the unnecessary DC component when the residual vibration is offset.

[Configuration of Second Control Portion 8]

Next, a configuration of the second control portion 8 will be described with reference to FIG. 4.

As shown in FIG. 4, the second control portion 8 includes a memory 81, an acquisition processing portion 82, a restriction processing portion 83, an oscillation processing portion 84, and a detection processing portion 85.

It is noted that the memory 81, the acquisition processing portion 82, the restriction processing portion 83, the oscillation processing portion 84, and the detection processing portion 85 may be provided in the first control portion 7. Specifically, the CPU 7A of the first control portion 7 may function as the acquisition processing portion 82, the restriction processing portion 83, the oscillation processing portion 84, and the detection processing portion 85 by executing the control programs stored in advance in the ROM 7B. In this case, the image forming apparatus 100 does not have to include the second control portion 8.

The memory 81 is used to store the image data after conversion by the conversion processing.

When the conversion processing is executed, the second control portion 8 stores, in the memory 81, the image data obtained by converting each item of the pixel data into the ejection pixel data or the non-ejection pixel data by the conversion processing.

When the image formation processing is executed, the acquisition processing portion 82 acquires the length of the non-ejection period in which ink is not ejected from the nozzles 30A which is included in the execution period of the image formation processing.

For example, the acquisition processing portion 82 acquires the length of the non-ejection period based on the image data stored in the memory 81.

When the length of the non-ejection period acquired by the acquisition processing portion 82 is less than a predetermined first threshold value, the restriction processing portion 83 restricts execution of the abnormality detection processing for detecting an abnormality of the nozzle 30A using the piezoelectric element 30C. Here, the first threshold value is determined based on the time required to execute the abnormality detection processing.

Here, the abnormality of the nozzle 30A is a state in which ink is not normally ejected from the nozzle 30A. The abnormality of the nozzle 30A includes a state in which the viscosity of the ink in the pressure chamber 30B exceeds a predetermined tolerance value. In addition, the abnormality of the nozzle 30A includes a state in which air bubbles are mixed in the nozzle 30A and a state in which foreign matter such as dust or paper dust adheres to the nozzle 30A.

For example, the restriction processing portion 83 restricts the execution of the abnormality detection processing when the length of the non-ejection period acquired by the acquisition processing portion 82 is equal to or greater than the first threshold value and less than a second threshold value defined in a range exceeding the first threshold value. The second threshold value may be an arbitrarily determined time.

When the length of the non-ejection period acquired by the acquisition processing portion 82 is less than the second threshold value, the oscillation processing portion 84 oscillates the meniscus of the nozzle 30A based on the length.

For example, in the image forming apparatus 100, table data as shown in FIG. 9 is stored in the storage portion 6 in advance. The table data is data indicating the correspondence between the ink ejection interval at the nozzles 30A, i.e., the non-ejection period, and the number of oscillations of the meniscus of the nozzle 30A for each color. In the table data, the correspondence between the ink ejection interval at the nozzle 30A and the number of oscillations of the meniscus of the nozzle 30A for each color is determined so that the longer the ink ejection interval at the nozzle 30A, the larger the number of oscillations of the meniscus of the nozzle 30A for each color.

For example, when the length of the non-ejection period acquired by the acquisition processing portion 82 is less than the second threshold value, the oscillation processing portion 84 acquires the number of oscillations of the meniscus of the nozzle 30A based on the length and the table data.

The oscillation processing portion 84 then causes the drive circuit 30E to output a drive signal for oscillation (see FIG. 8) based on the acquired number of oscillations of the meniscus of the nozzle 30A, thereby oscillating the meniscus of the nozzle 30A by the acquired number of oscillations.

Figure 8:
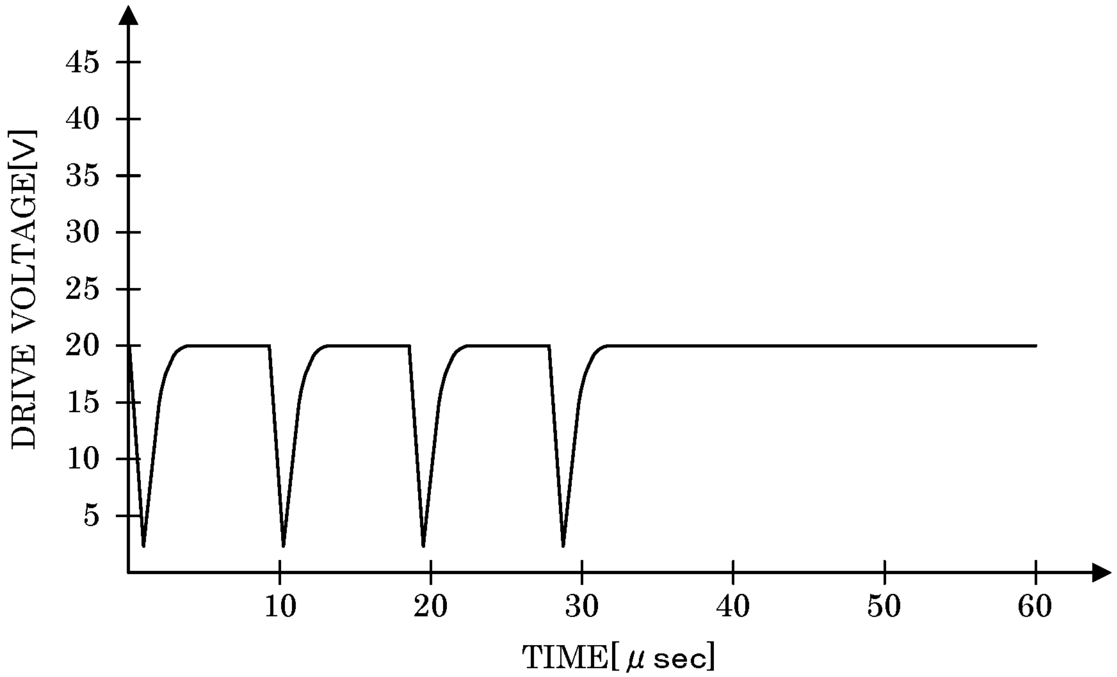
FIG. 8 is a diagram showing an example of a drive signal for oscillation input to the piezoelectric element of the image forming apparatus according to the embodiment of the present disclosure.

Here, the drive signal for oscillation is a signal capable of generating vibration in the pressure chamber 30B and incapable of causing the nozzle 30A to eject ink. For example, as shown in FIG. 8, the drive signal for oscillation is a signal having a pull-push drive pulse waveform of the same number of pulses as the number of oscillations of the meniscus of the nozzle 30A. The drive circuit 30E generates the drive signal for oscillation in response to an input of one or more predetermined items of oscillation pixel data from the oscillation processing portion 84, and outputs the generated drive signal for oscillation. It is noted that the drive signal for oscillation may be a signal having a push-pull drive pulse waveform.

When the length of the non-ejection period acquired by the acquisition processing portion 82 is equal to or greater than the second threshold value, the detection processing portion 85 executes the abnormality detection processing at a timing based on the end of the non-ejection period.

For example, the detection processing portion 85 executes the abnormality detection processing at a timing when the end of the non-ejection period arrives immediately after the end of the abnormality detection processing.

For example, the detection processing portion 85 inputs the detection pixel data to the drive circuit 30E, thereby causing the drive circuit 30E to output the drive signal for detection. The drive signal for detection is thereby input to the piezoelectric element 30C.

In addition, the detection processing portion 85 switches the switch 38 from the ON state to the OFF state after the drive signal for detection is input to the piezoelectric element 30C. Thus, the input signal output from the piezoelectric element 30C in response to the input of the drive signal for detection is input to the residual vibration detection circuit 37.

The detection processing portion 85 then detects an abnormality of the nozzle 30A based on a pulse signal output from the residual vibration detection circuit 37 in response to the input of the input signal to the residual vibration detection circuit 37.

For example, when the viscosity of the ink in the pressure chamber 30B increases, the amplitude of the residual vibration decreases, and the number of pulse signals output from the residual vibration detection circuit 37 decreases. Therefore, the detection processing portion 85 can determine that the nozzle 30A is abnormal when the number of pulse signals output from the residual vibration detection circuit 37 is equal to or less than a predetermined reference value.

In addition, when air bubbles are mixed into the nozzle 30A or when foreign matter adheres to the nozzle 30A, the period of the residual vibration becomes irregular, and the pulse signals are not output from the residual vibration detection circuit 37 at regular intervals. Therefore, the detection processing portion 85 can determine whether or not the nozzle 30A is abnormal based on the output interval of a plurality of pulse signals consecutively output from the residual vibration detection circuit 37.

It is noted that, when the length of the non-ejection period acquired by the acquisition processing portion 82 is equal to or greater than the second threshold value, the detection processing portion 85 may execute the abnormality detection processing at an arbitrary timing within the non-ejection period.

[Abnormality Detection Processing]

Figure 10:
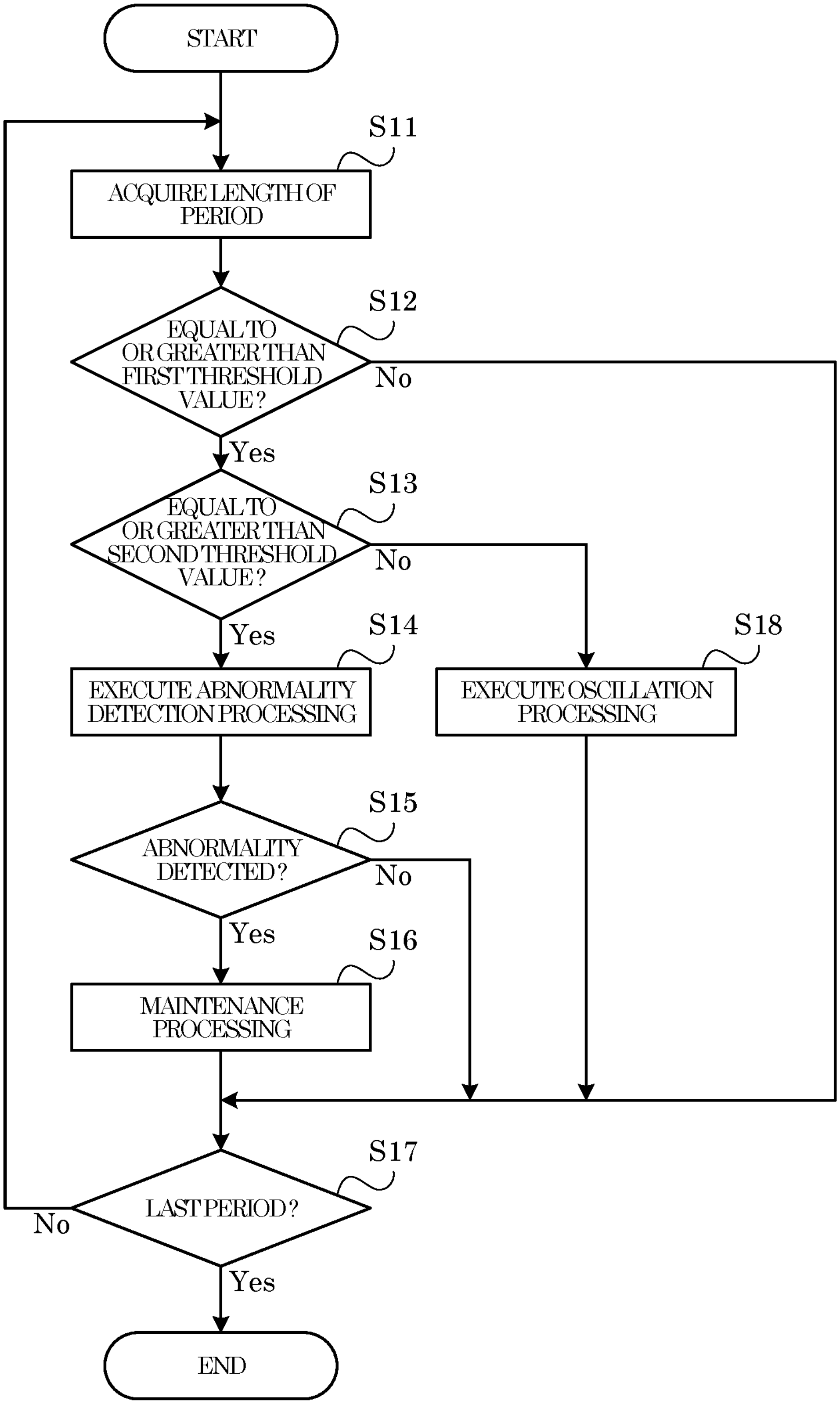
FIG. 10 is a flowchart showing an example of abnormality detection processing executed in the image forming apparatus according to the embodiment of the present disclosure.

The abnormality detection method of the present disclosure will be described with reference to FIG. 10, along with an example of the procedure of abnormality detection processing executed by the second control portion 8 in the image forming apparatus 100. Here, steps S11, S12, . . . represent the numbers of the processing procedure (steps) executed by the second control portion 8. It is noted that the abnormality detection processing is executed together with the image formation processing when the image formation processing is executed. In addition, the abnormality detection processing is executed for each nozzle 30A. Hereinafter, the abnormality detection processing corresponding to one of the plurality of nozzles 30A (hereinafter referred to as a "target nozzle") will be described.

<Step S11>

First, in step S11, the second control portion 8 acquires the length of the non-ejection period for the target nozzle. Here, the process of step S11 is executed by the acquisition processing portion 82 of the second control portion 8. The process of step S11 is an example of the acquisition step of the present disclosure.

Specifically, the second control portion 8 acquires the length of the non-ejection period based on a plurality of items of pixel data used for controlling the ejection of ink from the target nozzle among the image data stored in the memory 81. For example, the second control portion 8 checks a plurality of items of pixel data used for controlling the ejection of ink from the target nozzle in the order in which the items of pixel data are input to the drive circuit 30E, thereby acquiring the length of the non-ejection period whose end arrives earliest.

<Step S12>

In step S12, the second control portion 8 determines whether or not the length of the non-rejection period acquired by the process of step S11 is equal to or greater than the first threshold value. Here, the process of step S12 is executed by the restriction processing portion 83 of the second control portion 8. The process of step S12 is an example of the restriction step of the present disclosure.

Here, when the second control portion 8 determines that the length of the non-rejection period is equal to or greater than the first threshold value (Yes in S12), the second control portion 8 shifts the processing to step S13. When the length of the non-rejection period is not equal to or greater than the first threshold value (No in S12), the second control portion 8 shifts the processing to step S17. Thus, the execution of the abnormality detection processing when the length of the non-ejection period is less than the first threshold value is restricted.

<Step S13>

In step S13, the second control portion 8 determines whether or not the length of the non-ejection period acquired by the process of step S11 is equal to or greater than the second threshold value. Here, the process of step S13 is executed by the restriction processing portion 83 of the second control portion 8.

Here, when the second control portion 8 determines that the length of the non-ejection period is equal to or greater than the second threshold value (Yes in S13), the second control portion 8 shifts the processing to step S14. In addition, when the length of the non-rejection period is not equal to or greater than the second threshold value (No in S13), the second control portion 8 shifts the processing to step S18. Thus, the execution of the abnormality detection processing when the length of the non-ejection period is less than the second threshold value is restricted.

<Step S14>

In step S14, the second control portion 8 executes the abnormality detection processing. Here, the process of step S14 is executed by the detection processing portion 85 of the second control portion 8.

Specifically, the second control portion 8 executes the abnormality detection processing at a timing when the end of the non-ejection period arrives immediately after the end of the abnormality detection processing. It is noted that the second control portion 8 can determine the execution timing of the abnormality detection processing based on the execution time of the abnormality detection processing and the plurality of items of pixel data used for controlling the ejection of ink from the target nozzle among the image data stored in the memory 81.

<Step S15>

In step S15, the second control portion 8 determines whether or not an abnormality of the nozzle 30A has been detected by the process of step S14.

Here, when the second control portion 8 determines that an abnormality of the nozzle 30A has been detected (Yes in S15), the second control portion 8 shifts the processing to step S16. When an abnormality of the nozzle 30A has not been detected (No in S15), the second control portion 8 shifts the processing to step S17.

<Step S16>

In step S16, the second control portion 8 executes maintenance processing for eliminating the abnormality of the nozzle 30A.

Specifically, the second control portion 8 interrupts the image formation processing being executed and executes the maintenance processing. For example, the maintenance processing is a purge processing for ejecting ink from some or all of the nozzles 30A including the nozzle 30A for which the abnormality has been detected.

<Step S17>

In step S17, the second control portion 8 determines whether or not the non-ejection period, the length of which has been acquired in step S11, is the last non-ejection period that arrives during the execution period of the image formation processing.

Here, when the second control portion 8 determines that the non-ejection period, the length of which has been acquired in step S11, is the last non-ejection period that arrives during the execution period of the image formation processing (Yes in S17), the second control portion 8 ends the abnormality detection processing. When the non-ejection period, the length of which has been acquired in step S11, is not the last non-ejection period that arrives during the execution period of the image formation processing (No in S17), the second control portion 8 waits for the end of the non-ejection period and shifts the processing to step S11.

<Step S18>

In step S18, the second control portion 8 executes oscillation processing for oscillating the meniscus of the target nozzle based on the length of the non-rejection period acquired by the process of step S11. Here, the process of step S18 is executed by the oscillation processing portion 84 of the second control portion 8.

For example, the second control portion 8 acquires the number of oscillations of the meniscus of the target nozzle based on the length of the non-rejection period acquired by the process of step S11 and the table data. The second control portion 8 then causes the drive circuit 30E to output the drive signal for oscillation (see FIG. 8) based on the acquired number of oscillations of the meniscus of the target nozzle, thereby oscillating the meniscus of the target nozzle by the acquired number of oscillations.

As described above, in the image forming apparatus 100, when the length of the non-ejection period is less than the first threshold value, the execution of the abnormality detection processing is restricted. Thus, by determining the first threshold value based on the time required to execute the abnormality detection processing, it is possible to prevent the abnormality detection processing from being executed when the abnormality detection processing cannot be completed within the non-ejection period. Accordingly, an abnormality of the nozzle 30A can be detected without hindering the execution of the image formation processing.

In addition, when the length of the non-ejection period is less than the second threshold value, the image forming apparatus 100 restricts the execution of the abnormality detection processing and executes the oscillation processing for oscillating the meniscus of the nozzle 30A. Thus, when the non-ejection period is relatively short, both the abnormality detection processing and the oscillation processing, which cannot be executed simultaneously, are executed, thereby suppressing insufficient oscillation of the meniscus by the oscillation processing.

In addition, in the image forming apparatus 100, when the length of the non-ejection period is equal to or greater than the second threshold value, the abnormality detection processing is executed at a timing based on the end of the non-ejection period. Thus, when the length of the non-ejection period is equal to or greater than the second threshold value, it is possible to oscillate the meniscus of the nozzle 30A by generating the residual vibration in the pressure chamber 30B immediately before ink is ejected from the nozzle 30A. Therefore, it is possible to simplify the processing by omitting the oscillation processing and to suppress the deterioration of the image quality due to the increase in the viscosity of the ink.

It is noted that the oscillation processing portion 84 may oscillate the meniscus of the nozzle 30A when the length of the non-ejection period acquired by the acquisition processing portion 82 is equal to or greater than the second threshold value. In this case, when the length of the non-ejection period acquired by the acquisition processing portion 82 is equal to or greater than the second threshold value, the detection processing portion 85 may execute the abnormality detection processing before the meniscus of the nozzle 30A is oscillated by the oscillation processing portion 84.

In addition, the liquid of the present disclosure need not be limited to ink.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A liquid ejection apparatus comprising:
- a nozzle configured to eject a liquid;
- a pressure chamber communicating with the nozzle and configured to contain the liquid;
- a piezoelectric element configured to change a pressure in the pressure chamber in response to an input of a drive signal;
- an acquisition processing portion configured to, when image formation processing for ejecting the liquid from the nozzle is executed based on image data, acquire a length of a non-ejection period in which the liquid is not ejected from the nozzle, the non-ejection period being included in an execution period of the image formation processing; and
- a restriction processing portion configured to, when the length of the non-ejection period acquired by the acquisition processing portion is less than a predetermined first threshold value, restrict execution of abnormality detection processing for detecting an abnormality of the nozzle using the piezoelectric element.

2. The liquid ejection apparatus according to claim 1, further comprising:
- an oscillation processing portion configured to, when the length of the non-ejection period acquired by the acquisition processing portion is equal to or greater than the first threshold value and less than a second threshold value defined in a range exceeding the first threshold value, oscillate a meniscus of the nozzle based on the length, wherein
- the restriction processing portion restricts the execution of the abnormality detection processing when the length of the non-ejection period acquired by the acquisition processing portion is less than the second threshold value.

3. The liquid ejection apparatus according to claim 2, further comprising:

a detection processing portion configured to, when the length of the non-ejection period acquired by the acquisition processing portion is equal to or greater than the second threshold value, execute the abnormality detection processing at a timing based on an end of the non-ejection period.

4. The liquid ejection apparatus according to claim 2, wherein when the length of the non-ejection period acquired by the acquisition processing portion is equal to or greater than the second threshold value, the oscillation processing portion oscillates the meniscus of the nozzle, and the liquid ejection apparatus includes:

a detection processing portion configured to, when the length of the non-ejection period acquired by the acquisition processing portion is equal to or greater than the second threshold value, execute the abnormality detection processing before the meniscus of the nozzle is oscillated by the oscillation processing portion.

5. An abnormality detection method executed by a liquid ejection apparatus comprising: a nozzle configured to eject a liquid, a pressure chamber communicating with the nozzle and configured to contain the liquid; and a piezoelectric element configured to change a pressure in the pressure chamber in response to an input of a drive signal, the method comprising:

an acquisition step of, when image formation processing for ejecting the liquid from the nozzle is executed based on image data, acquiring a length of a non-ejection period in which the liquid is not ejected from the nozzle, the non-ejection period being included in an execution period of the image formation processing; and a restriction step of, when the length of the non-ejection period acquired by the acquisition step is less than a predetermined first threshold value, restricting execution of abnormality detection processing for detecting an abnormality of the nozzle using the piezoelectric element.

* * * * *